April 11, 1950     L. S. WILLIAMS     2,503,698
MOUNTING FOR LOAD RESPONSIVE CAPSULES
Filed Feb. 9, 1946
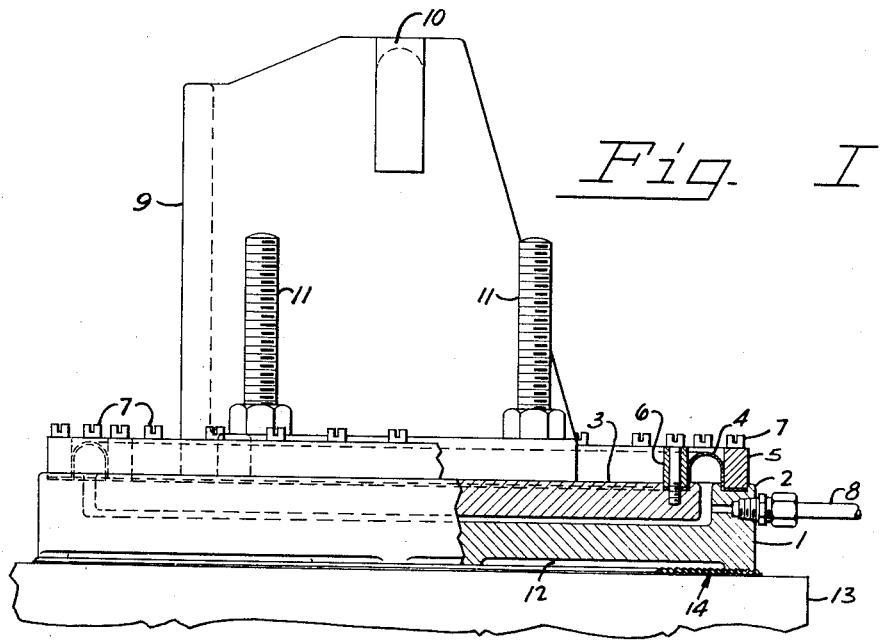
Fig. I
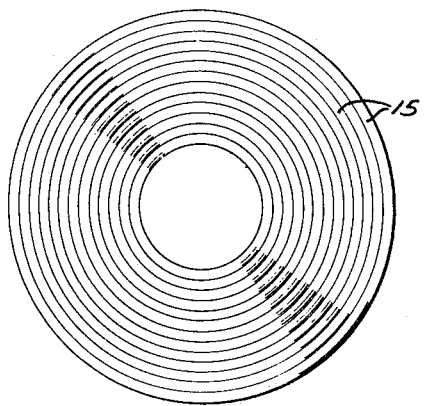
Fig. II
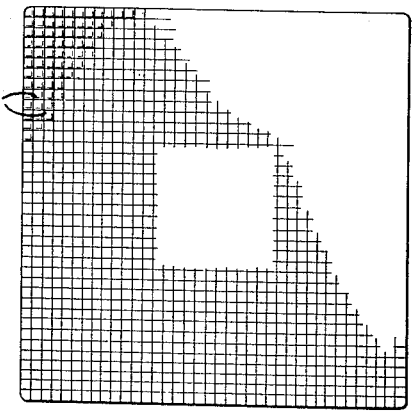
Fig. IV
Fig. III
INVENTOR.
Lawrence S. Williams
BY
Marshall & Marshall
ATTORNEYS Patented Apr. 11, 1950

2,503,698

UNITED STATES PATENT OFFICE 2,503,698

MOUNTING FOR LOAD RESPONSIVE CAPSULES

Lawrence S. Williams, Toledo, Ohio, assignor to Toledo Scale Company, Toledo, Ohio, a corporation of New Jersey Application February 9, 1946, Serial No. 646,592

4 Claims. (Cl. 137—157)

This invention relates to hydraulic weighing scales and in particular to an improved arrangement for mounting the load receiving capsules on their foundations.

One of the requirements in the installation of any weighing scale, whether it employ hydraulic force transmitting elements or mechanical levers, is that the fulcrum stands for the lever scale or the bases of the hydraulic capsules of a hydraulic scale shall not shift or deflect when load is applied to the scale. In a lever scale such shifting causes changes in the angularity in the connections between levers as well as the condition of level of the levers themselves and thereby causes errors in the force transmission from the load receiver to the load counterbalancing mechanism. In a hydraulic scale any shifting or unsteadiness of a lower member of a capsule acts through the capsule to cause changes in the force-to-pressure translation ratio of the capsule. If the capsules are not securely mounted it is impossible to get the scale to perform consistently. While a firm support for the capsules could be obtained by setting the capsules in concrete such a procedure makes it extremely difficult to replace a capsule if one should be damaged.

The principal object of this invention is to provide a mounting arrangement for the lower plate of a hydraulic capsule which will firmly support the capsule without interfering with its removal should replacement be necessary.

Another object of the invention is to provide an improved mounting arrangement for a hydraulic capsule of a weighing scale which mounting will adjust itself during the first time the scale is loaded and thereafter firmly maintain the capsule in position.

Another object is to provide means for mounting a hydraulic capsule used as a support for the load receiver of a weighing scale which means will accommodate itself to small irregularities of the capsule or its foundation and prevent any shifting or tipping of the capsule on its foundation.

These and other objects and advantages are apparent from the drawings and the following description.

The objects of the invention are attained by interposing a sheet of deformable, nonresilient material between the lower surface of the hydraulic capsule and the foundation on which the capsule is supported. Such a sheet of material has the property that it will deform in the regions of high unit pressure and thereby allow the capsule plate to settle until substantially uniform pressure is exerted throughout its entire bearing surface. If the sheet of material is nonresilient the capsule will remain in its settled position after the removal of load and further repetitions of the loading will not alter its position. Therefore the scale may be calibrated after it has once been loaded to capacity with assurance that the capsules will not later shift on their foundations and thereby introduce errors into the weight indications. If a rigid material is used instead of the deformable nonresilient material or if the capsule is placed directly on the foundation it will be supported on a few points which may or may not give a stable position. The nonresilient deformable sheet of material effectively prevents any such shifting or deflection of the capsule.

The unit pressures involved between a capsule and its foundation in an ordinary hydraulic weighing scale are insufficient to cause cold flow of even a soft material such as lead, if the material is used in the form of a flat sheet. To achieve greater yielding of the deformable material during the first time the scale is being loaded the sheet of deformable material is corrugated or dimpled so that the forces developed between the hydraulic capsule and the high spots of its foundation will smooth out the corrugations while the remainder of the sheet remains in more or less corrugated form depending upon the evenness of the surface of the foundation.

While lead is preferred as a deformable material because of its ductility other ductile materials may also be used with similar results. A sheet of ductile material offers an advantage over the use of concrete or other material which hardens after the capsule has been put in place because no bonding takes place and therefore no harm is done to the foundation when a capsule is replaced.

A specific embodiment of the invention in which these objects and advantages are attained is illustrated in the drawings.

In the drawings:

Figure I is a side elevation, partly in section and with parts broken away, showing the improved means for supporting a capsule from a foundation.

Figure II is a plan view of a sheet of corrugated material suitable for use under the capsule shown in Figure I.

Figure III is a fragmentary cross sectional view of the sheet of corrugated material shown in Figure II.

Figure IV is a plan view of another form of sheet of material showing a different type of corrugation.

These specific figures and the accompanying description are intended merely to illustrate the invention and not to impose limitations on the claims.

A hydraulic capsule for use in a weighing scale comprises a flat casting or base plate 1 having an upstanding rim 2 forming a shallow dish-like structure. A flat diaphragm 3 is adapted to lie within the dish-like structure with a small clearance between its periphery and the upstanding rim 2. The diaphragm 3 is supported by hydraulic fluid confined in the space beneath it and the fluid is prevented from escaping by a metallic membrane 4 formed as a semicircular arch anchored to the rim 2 by a clamping bar 5 and to the diaphragm 3 by a clamping bar 6, the clamping bars 5 and 6 being held by a plurality of screws 7. A pipe 8 communicating with the chamber formed below the diaphragm 3 serves to transmit the pressure of the hydraulic fluid to a pressure receiving unit mechanically connected to a load counterbalancing mechanism.

A three sided box-like member 9 bolted to the diaphragm 3 provides support for a cross bar 10 from which cross bar brackets supporting a load receiver may be suspended. A plurality of vertical threaded studs 11 threaded into the diaphragm 3 adjacent the box-like member 9 serves to connect the diaphragm 3 to a framework similarly connected to other load supporting capsules which framework prevents any tipping of the diaphragms as loads are applied to the scale. The bottom of the capsule plate 1 is formed with a number of shallow ribs 12 extending downwardly from the bottom surface of the plate.

The hydraulic capsule is supported from a foundation 13 which may be a concrete pier erected in a pit designed to accommodate the platform of the weighing scale. The upper surface of such a foundation is usually rough and even if trowelled, is liable to be uneven. Because of this unevenness a corrugated lead sheet 14 is interposed between the capsule and the foundation 13. The corrugated sheet 14 is large enough in area to accommodate the greater part of the projected area of the capsule. If the capsule is circular or substantially so the corrugated sheet is made large enough to accommodate its whole area. If a square capsule is employed and a circular sheet is used it is permissible to allow the corners of the capsule to extend slightly beyond the periphery of the sheet.

The sheet 14 may be either circular, rectangular or any other shape and preferably is corrugated to facilitate its deformation in conforming to the irregularities of the surface of the foundation 13. When the sheet is circular as is shown in Figure II circular corrugations 15 may be employed and they may be carried entirely to the center or not as a matter of choice. The corrugations 15 should preferably be at least of such depth that the apparent thickness of the material is doubled. A suitable size of corrugation is shown in Figure III. When such a corrugated sheet of material is placed under the bottom of a capsule and the load is applied those portions of the sheet located on the high spots of the foundation will be subjected to high unit pressures and the corrugations of those regions will be pressed down so as to relieve the high pressures and shift part of the load to the adjacent regions of the foundation. The yielding of the corrugations of the sheet combined with the load concentrating effect of the ribs 12 formed on the lower surface of the capsule are such that the load is substantially uniformly distributed throughout the area of the capsule when the weighing capacity of the scale is reached. After the scale has once been loaded to capacity and the corrugated sheet 15 has been pressed to conform to the irregularities of the capsule and the foundation the sheet will retain its deformed shape after the load has been removed and will not undergo any appreciable further deformation during subsequent loadings.

If a square sheet of material is used such as the sheet 16 (Figure IV) the corrugations may be straight and all oriented along one axis or they may be crossed to provide a dimpled surface. Either type of corrugation will give satisfactory results although the dimpled form is preferable where the unit pressures involved are relatively low.

Sheet lead corrugated according to the invention provides a suitable material since it has the properties of being deformable and nonresilient. The material dare not be resilient because if it were so it would regain its original form when the load on the scale was removed and the advantages of stability would be lost. However, any ductile material which is subject to cold flow under the unit pressure involved in supporting the capsule would be satisfactory as a capsule stabilizing support.

The important element in practicing the invention is to insure that sufficient deformable material is included around the edges of the capsule so that the edges are given a firm support capable of preventing any tipping of the capsule under load. The support at the center of the capsule is not nearly so critical and it is for this reason that the centers of the corrugated sheets 14 and 16 may be left flat without corrugations or even cut out entirely without affecting the performance of the capsule.

While a specific form of the invention has been disclosed it is apparent that modifications may be made without departing from the spirit of the invention which resides in providing a ductile nonresilient pad or sheet of material which is designed to yield under high unit pressures and thereby provide a substantially uniform support for a hydraulic capsule.

Having described my invention, I claim:

1. In a weighing scale incorporating hydraulic force transmitting elements, in combination, a hydraulic capsule serving as a support for a load receiver, a foundation for the capsule, and a sheet of deformable nonresilient material interposed between the capsule and the foundation.

2. In a weighing scale incorporating hydraulic force transmitting elements, in combination, a hydraulic capsule serving as a support for a load receiver, a foundation for the capsule, and a corrugated sheet of deformable nonresilient material interposed between the capsule and the foundation.

3. In a weighing scale incorporating hydraulic force transmitting elements, in combination, a hydraulic capsule serving as a support for a load receiver, a foundation for the capsule, and a corrugated lead sheet interposed between the capsule and the foundation.

4. In a weighing scale incorporating hydraulic force transmitting elements, in combination, a hydraulic capsule serving as a support for a load receiver, the capsule having ribs in low relief formed in its under surface, a foundation for supporting the capsule, and a sheet of a deformable, nonresilient material interposed between the capsule and the foundation.

LAWRENCE S. WILLIAMS.

REFERENCES CITED

The following references are of record in the file of this patent:

UNITED STATES PATENTS

| Number | Name | Date |
|---|---|---|
| 1,440,498 | Shurtleff | Jan. 2, 1923 |
| 1,840,741 | Reid | Jan. 12, 1932 |
| 2,313,655 | Marshall | Mar. 9, 1943 |
| 2,414,550 | Patch | Jan. 21, 1947 |